Dec. 28, 1948.   R. L. MELTON ET AL   2,457,256
APPARATUS FOR MANUFACTURE OF COATED WEBS
Filed Dec. 29, 1939   2 Sheets-Sheet 2
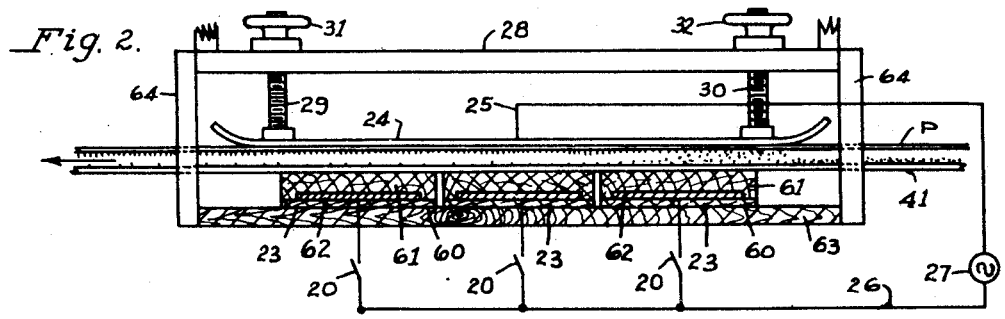
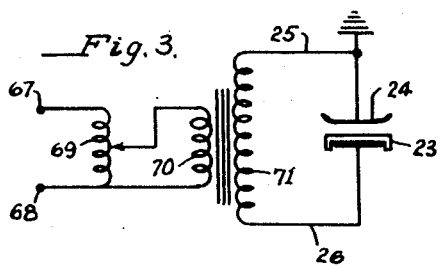
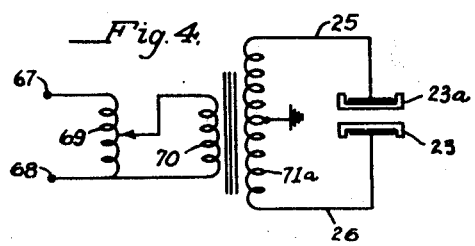
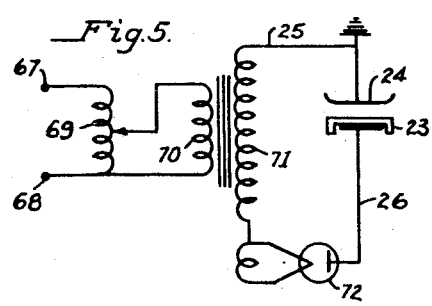
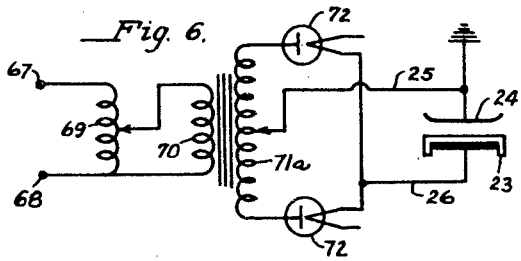
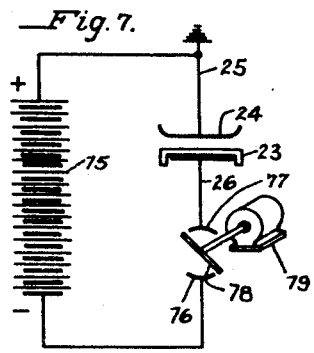
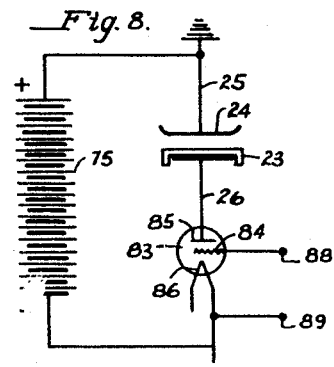
INVENTORS.
ROMIE L. MELTON
RAYMOND C. BENNER
HENRY P. KIRCHNER
BY
ATTORNEY.

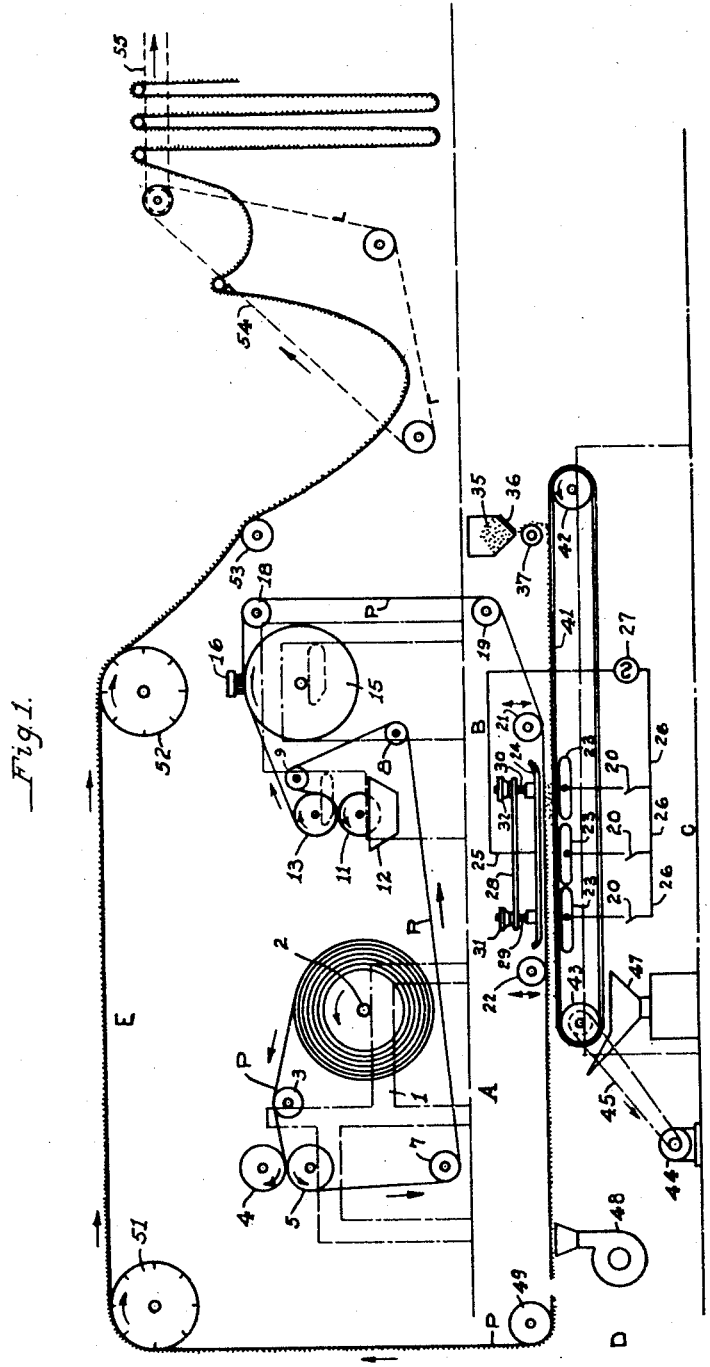

Patented Dec. 28, 1948

2,457,256

UNITED STATES PATENT OFFICE 2,457,256

APPARATUS FOR MANUFACTURE OF COATED WEBS

Romie L. Melton, Raymond C. Benner, and Henry P. Kirchner, Niagara Falls, N. Y., assignors to The Carborundum Company, Niagara Falls, N. Y., a corporation of Delaware Application December 29, 1939, Serial No. 311,606

15 Claims. (Cl. 91—18)

This invention relates to improved apparatus for the manufacture of granular coated webs of such materials as paper, cloth or the like and has for an object the provision of improved machinery for securing a superior product, greater efficiency and/or lower cost of production of coated articles.

This application is a continuation-in-part of our co-pending application, Serial No. 636,982, filed October 10, 1932, and issued January 16, 1940, as U. S. Patent No. 2,187,624.

Abrasive particles commonly used in the manufacture of abrasive coated webs are of irregular shape and have some surfaces or edges that are sharper than others and more suitable for abrading operations when these sharper surfaces, edges or points are positioned to engage the material being abraded. The usual method of applying granular particles to a web has been by dropping the particles from a hopper onto an adhesively coated web, and since the particles, when dropped, fall in a haphazard fashion, the usual method has not resulted in an orderly orientation of the particles.

It has been found heretofore that better granular coated webs for such purposes as abrading operations can be produced by causing at least some of the granular particles deposited upon the web to become so oriented that their longer axes project normally from the surface of the web. Various suggestions have been made for the employment of electrostatic fields in effecting orientation of the granular particles, but the machines heretofore proposed have not been entirely satisfactory, principally because they produce but very limited orientation of the particles. We have developed a machine by which a degree of orientation is secured that is far in excess of that obtained by the use of prior machines known to us, so that the abrasive paper or cloth made on a machine made in accordance with our invention is much sharper and greatly superior for grinding operations.

We have found that abrasive coated webs made by orienting a large proportion of the abrasive particles in such a manner that their longer dimensions are normal to the web to which they are attached, are decidedly faster cutting and more efficient than coated webs in which the particles are haphazardly arranged or in which but a relatively few of the abrasive particles are so oriented.

We have found that the electrostatic orientation of certain materials, such as, for example, granular particles of 200 to 600 mesh and smaller, elongated fibrous materials, bristles, and the like, may be very much improved by means of a pulsating or alternating electromotive force. Such an alternating current field disperses these particles, causes them to be individually separated and overcomes the natural tendency of such materials to form into an agglomerate mass. Thus, instead of being deposited as a ball or cluster of particles clinging together, any agglomerates are disintegrated by the action of the alternating electromotive force and the dispersed particles form a dense cloud of individually separated and spaced apart particles as they are electrically projected onto the surface being coated.

We have found that apparatus constructed in accordance with our invention will arrange a greater number of particles according to the desired orientation than any other apparatus heretofore known to us. Apparatus constructed in accordance with our invention differs from that heretofore known in that the positions of the granular particles are under control during the time they are susceptible to arrangement or rearrangement and does not require alteration of the web or of any part of the granular coated web to produce an electrically conductive article in order to secure the desire orientation.

We have found that a superior product can be obtained when the electrostatic field not only directs the particles toward the adhesive coated web, but also orients and propels the oriented particles into engagement with the adhesive coated web. Apparatus constructed in accordance with our invention produces a particularly good article because the particles are oriented and propelled by the action of the electrostatic field alone and are not detrimentally influenced by other forces, such as gravity, which materially offset the effect of the electrostatic field in producing a granular coated web in which the particles are arranged on the web in a certain desired position.

A better understanding of our invention can be secured by referring to the following drawings in which:

Figure 1 is a diagrammatic elevation of the complete apparatus;

Figure 2 is an elevation, partly in section, of the device for electrostatically applying the grain; and Figures 3, 4, 5, 6, 7, and 8 show diagrammatically several types of high voltage apparatus suitable for use as the source of electromotive force required by the apparatus illustrated in Figures 1 and 2.

Referring to the illustrated embodiment of the invention, there is a means A for holding and dispensing a roll 2 of the web P of paper, cloth or the like; means B for applying adhesive to one face of the web P; means C for applying granular material to the adhesive side of the web P; means D for causing a preliminary set of the adhesive; and means E for drawing the web through the coating apparatus and into a drying chamber.

The means A for holding and dispensing the web P comprises, as shown in the drawing, a frame 1 that supports the roll 2 of web P; an idler roll 3 for guiding the web; printing rolls 4 and 5 for marking the web with any desired legend or identification; and an idler roll 7 for guiding the web.

The adhesive applying means B comprise, as shown in the drawing, idler roll 8 and 9 for guiding the web; a roll 11 positioned to dip into a pan 12 of adhesive; a roll 13 for maintaining contact between the web P and the roll 11; a drum 15 and an adhesive distributing brush 16 positioned above the said drum 15; and an idler roll 18 for guiding the web as it is brought from the distributing brush.

The means C for applying granular material to the web P comprises, as shown in the drawing, an idler roll 19 for guiding the web; rolls 21 and 22, which are adjustably positioned to move as a unit, for positioning the web; low conductivity electrodes 23 and a metal or good conducting electrode 24, the upper electrode 24 being adjustably spaced from the lower electrodes 23; an endless feed belt 41 of canvas or the like, positioned between the electrodes 23 and 24 and supported by the pulleys 42 and 43; a hopper 35 with an adjustable gate 36 and a roll 37 for dispensing the granular material to the feed belt 41; and variable speed driving means 44 for operating the feed belt 41. A bin 47 is provided to receive any granular particles which are not deposited on the web P.

The means C for applying granular material to the web P also comprises a source of electromotive force, the effective potential of which is 30,000 to 100,000 volts, indicated in Figures 1 and 2 by the symbol and reference character 27 and shown more in detail in Figures 3, 4, 5, 6, 7 and 8. The source of electromotive force 27 may produce a continuous unidirectional current, an intermittent unidirectional current, a pulsating current, an alternating current, or rectified alternating current. When a pulsating current is employed, the duration of the pulsations should be great enough to effectively project and orient the particles. We have found an alternating current having a frequency of 25 cycles to be satisfactory, particularly with particles of relatively small size. In certain instances, however, it is desirable to employ lower frequencies and the source of electromotive force should be capable of delivering electrical impulses of any desired frequency from 25 cycles per second down to 5 cycles per second, or lower.

Ordinarily, the lower electrodes 23 are connected to one terminal of the source of high voltage 27 by the cable 26 and the upper electrode 24 connected to the other terminal by the cable 25 and is also grounded as a precautionary measure. The connections and/or arrangement of the electrodes 23 and 24 may be reversed if it is so desired. Furthermore, electrodes, similar in character to the poorly conducting electrodes 23, may be substituted for the upper bare metal electrode 24 and then both lower and upper electrodes charged at a high potential above ground.

The means D for causing the adhesive to acquire a preliminary set comprises, as shown in the drawing, an idler roll 49 and a fan blower 48 for supplying a large volume of air at a low velocity to the adhesive and granular coated side of the web P.

The means E for drawing the web P from the coating apparatus into the drying chamber comprises, as shown in the drawing, one or more suction drums 51 and 52; an idler roll 53; a rack 55 for supporting the web P; and an endless conveyor 54 for transporting loops of the web P to the rack 55.

The character of the bottom electrodes 23 appears to be of great importance in the operation of our apparatus and preferably are made of some poorly conducting material. The materials should be so poorly conducting at the voltages employed that not enough current can flow along or through it to cause arcing between the bottom and top electrodes, yet it should be sufficiently conducting to allow a small leakage current to supply electrical charges to the granular material in order that they may be repulsed from the feed belt and projected upwardly against the downwardly facing adhesively coated web.

When we speak of a poorly conducting material, we use this expression to distinguish between such materials as metals, carbon, or the like, which are relatively good conductors of electricity, on the one hand, and highly insulating materials such as glass, hard rubber, varnished cambric or the like, which are such good insulators at the voltages we prefer to apply to our apparatus that the leakage current which flows through them is insufficient to charge the granular material to the degree necessary to cause it to be propelled to the adhesive coated web, on the other hand.

For this purpose, we have found dry knot-free wood and such materials as those sold under the trade names of "Micarta" and "Bakelite" to be satisfactory. While these materials are so poorly conducting that they will not carry enough current to allow spark-over or arcing between the bottom and top electrodes, they are conductive enough to allow sufficient leakage at the operating voltages to supply the small amount of electrostatic charges required for the propulsion of the abrasive particles.

While "Micarta" and "Bakelite" materials, preferably in the form of channels, have been found to be most satisfactory, other materials that ordinarly are classed as insulators but which are in fact poor conductors of high tension electric current may be employed. Such materials include dry white pine wood, free from knots, bonded fibrous material and other materials possessing the above described poorly conducting properties.

A better understanding of the construction of a suitable electrode can be had by reference to Figure 2, which shows in detail the grain deposition assembly including the lower electrodes 23.

The electrodes 23 as shown in Figure 2, are formed of a channel member 61 and flat sheet member 60 of poorly conducting material between which is placed a metal conducting plate 62. We have found it advantageous to use a distributing plate 62 in order to cause the charging current to divide and spread substantially evenly over the surface of the poorly conducting electrode and also to reduce the specific density of leakage current upwardly through the material to its top surface. It is preferable to enclose the metal distributing plate 62 in order that electrical leakage in other directions than that toward the upper surface of the electrode may be reduced. A good insulating material can be used instead of a poorly conducting material for the lower piece 60 of the electrode 23. If desired, however, the electrode member 60 may be dispensed with provided the length of the side walls of the channel member 61 are increased sufficiently to prevent electrical breakdown and sparking between the highly charged distributing plate 62 and the upper electrode 24.

The electrodes 23 are supported on a frame member 63, which is hung from a support 28 by means of hanger bars 64 of highly insulating material such as hard rubber. The upper electrode 24, which can be of any good conducting material, is hung from the support 28 by means of screws 29 and 30 which are threaded into adjusting nuts 31 and 32 respectively.

While a number of lower electrodes 23 are shown in Figure 1 and Figure 2, a single electrode of corresponding area can be used. It is preferred, however, to use a number of sections as indicated in Figures 1 and 2. This permits some of the electrodes to be disconnected by means of the switches 20, in case the electrostatic field is to be shortened, or additional electrodes to be added in case the electrostatic field is to be lengthened.

Figures 3, 4, 5, 6, 7 and 8 illustrate diagrammatically several types of electrical apparatus which may be employed as the source of electromotive force 27 previously referred to. The source of high voltage shown in Figure 3 delivers an alternating electromotive force and comprises a step-up transformer, having a low voltage winding 70 and a high voltage winding 71, which transforms a low voltage supply of 220 volts, more or less, up to a high voltage of 60,000 or 100,000 volts. An autotransformer 69 provides a ready means of adjusting the high voltage output to any desired value. A low voltage source of supply is connected to the input terminals 67 and 68 of the autotransformer 69 and preferably should be of a frequency of 25 cycles per second, or less. While we have found commercial 25 cycle current to be generally satisfactory, it is desirable in certain instances to employ lower frequencies. For this reason, a variable speed alternating current generator or a variable frequency thyratron inverter is provided for the low voltage source of power input to the transformer. The high voltage terminals of the transformer winding 71 are connected to the electrodes 23 and 24 by the cables 26 and 25 respectively.

The electrostatic field produced by such an alternating electromotive force is particularly useful in the orientation and deposition of certain materials, such as, the finer particles of granular and fibrous materials which have a tendency to cling together and form agglomerates or clusters.

The alternating current disperses such clusters and causes them to be completely broken up into individually separated particles and to be individually projected onto an adhesively coated web as a single layer of uniformly spaced particles. An agglomerate of particles in such an alternating field is seen to to be gradually reduced in size as the outside particles become detached therefrom and projected upwardly. The alternating electrical forces appear to act more on the individual particles and cause them to be projected rather than to project the entire agglomerate mass of particles. Such dispersion of the particles adds materially to the uniformity of the coated web since the turbulence produced thereby causes a more uniform cloud of projected particles and eliminates any tendency towards stratification and a streaky coating.

The apparatus shown in Figure 4 is similar to that of Figure 3 except that the midpoint of the high voltage transformer winding 71a is grounded and both ends of said winding are operated above ground potential. In addition the upper electrode 24 of Figure 3 is replaced by an electrode 23a, similar in character to the lower electrode 23, and both upper and lower electrodes are charged at a high potential above ground.

Figure 5 shows diagrammatically a vacuum tube rectifier 72 which rectifies the high voltage output from the transformer and thus delivers a rectified alternating current to the electrodes 23 and 24. This particular circuit rectifies only one-half of the alternating current wave so that the high voltage supplied to the electrodes 23 and 24 is in reality a series of periodic undirectional electrical impulses. Thus when a 25 cycle source of electrical power is connected to the input terminals 67, 68 the rectified current impulses occur 25 times per second and are spaced by an interval of one fiftieth of a second so that the wave shape resembles one-half of a sine curve.

The electrostatic field produced by such a source of electromotive force is a pulsating force acting always in the same direction. Such a pulsating field, however, gives a definite impetus to the particles being projected and causes them to move across the field with a greater velocity. The poorly conducting electrodes 23 prevent any electrical breakdown or sparking between electrodes during the periods of high electrical stress.

A full wave rectifier is shown in Figure 6. This source of electromotive force produces a pulsating wave similar to that of Figure 5 but with impulses closely spaced and twice in number per unit of time for a given frequency of electrical power source. The voltage ripple from a circuit of this type is usually in the order of 40%. In cases where it is desired to eliminate such a voltage ripple or pulsations, it is necessary to add an electrical filter circuit, composed of choke coils and condensers, in the high voltage circuit.

In all of the above high voltage devices the wave shape of the electrical impulse is similar to that of the conventional sine wave or a portion of said sine curve. Thus the electromotive force, and hence the intensity of the electrostatic field, increases and decreases at a uniform rate of change. While this is desirable in certain instances, there are times when it is preferable to employ pulsating currents having a square wave shape, a saw-tooth wave shape or a wave shape composed of two or more waves superimposed one on the other. For this reason, we have provided apparatus of the type illustrated by Figures 7 and 8.

The apparatus shown in Figure 7 is adapted to deliver an intermittent unidirectional current to the electrodes 23 and 24. A source of high voltage unidirectional current 75, which may be any suitable electrostatic generator or the apparatus of Figures 5 and 6 (with or without an additional filtering circuit), is connected through an intermittent switch mechanism, such as that formed by the contact sectors 76, 77 and revolving switch arm 78. The revolving contact arm 78 is insulated from the shaft of the driving motor 19. This motor may be of a variable speed type so that the period of pulsations can be adjusted to suit conditions. Furthermore, the length or number of the contact sectors 76 and 77 may be adjusted so that the interval of time of application of the electromotive force and the interval of open circuit may be altered to suit conditions. If it is desired to produce a sharp break in the wave shape of the applied electromotive force, additional contact sectors may be mounted and connected so that the electrodes 23, 24 are intermittently energized and short circuited. Thus the applied electromotive force has a rectangular wave shape in which the advancing wave crest is extremely steep, the peak generally flat and then a very sudden collapse as the electrodes are short circuited and the applied potential falls to zero.

In Figure 8 a thermionic vacuum tube 83 replaces the mechanical contactor of Figure 7. This vacuum tube 83 has a conventional control grid 84, anode 85 and cathode 86 but is designed for operation at voltages of 30,000 to 100,000 volts, or higher, across the cathode and anode members. Thus the control grid 84 can be made to stop the flow of current from the cathode 86 to the anode 85 by application of a biased potential applied across the terminals 88 and 89. This biased potential may be applied intermittently by a switching means such as that illustrated in Figure 7. Or an alternating wave of any desired frequency and wave shape may be applied across the terminals 88, 89 and a high voltage wave of corresponding frequency and shape applied to the electrodes 23, 24. This particular arrangement is advantageous in that a great variety of frequencies and wave shapes may be produced with relatively simple equipment. For example, we may produce a saw-tooth wave shape, a rectangular wave shape, or a complex wave shape of two or more combined waves. Or, we may superimpose a pulsating or alternating current wave of any desired shape characteristics onto the usual smooth unidirectional current in order to produce a pulsating electrostatic field.

We have also found that a pulsating electrostatic field can be produced by periodically varying the spacing between the electrodes 23 and 24. Changes in the spacing of said electrodes or condenser plates produces a corresponding variation of the voltage gradient and intensity of the electrostatic field. Thus the electrical forces acting on particles within the electrostatic field are increased and decreased in a manner similar to that produced by the use of pulsating electromotive force and a fixed spacing of the electrodes.

In the normal operation of the apparatus illustrated herein, a roll of the uncoated web P, such as paper or cloth, is rotatably mounted on the frame 1. The web is threaded over the roll 3 and between the printing rolls 4 and 5 and thence in contact with the idler rolls 7, 8 and 9 to the pressure roll 13 and the adhesive roll 11. The adhesive roll 11 dips into liquid adhesive contained in the adhesive tank 12, and by its rotation, applies a layer of adhesive to the web.

The adhesively coated material P passes between the brush drum 15 and a vibrating brush 16, which evenly distributes the adhesive and smooths out any ridges. It is then guided by the idler rolls 18, 19 and adjustable roll 21 into an electric field set up between the highly charged electrodes 23 and the low potential electrode 24.

Granular particles are distributed from the grain hopper 35 onto the grain feed belt 41, which moves through the electrical field parallel to the web material P and in the same direction therewith. As the granular material moves into and through the electrical field, the particles are dispersed, leave the belt and move upward toward the web, where they become attached because of the adhesive coating. It is believed that the granules become electrically charged as they move between the upper and lower electrodes and that the electrical charge carried by the granules congregates toward the opposite ends where the curvature is greatest, thus forming electrical doublets. Forces produced by the electric field then turn the charged granules so that their major axes are parallel to the lines of force of the field, and then cause the longitudinally oriented granules to move upwardly until they strike the adhesive coating on the underside of the material P and adhere in a vertically oriented position. The oriented particles, instead of moving in a body from the belt to the adhesive coated web, move as a spray or rain of individual particles separately spaced from one another.

When a pulsating or alternating electromotive force is employed it is necessary, of course, that the length of duration of such pulsations be sufficient for the particles to be oriented and projected upwardly against the web. By this we mean that the charged particles should be projected from the conveyor belt to the web before the polarity of the electromotive force is reversed. If such charged particles have not cleared the zone of influence of the lower electrode before the polarity of said electrode is reversed, then the particles are attracted back to the lower electrode rather than continuing on toward the web backing.

The grain particles on the belt may receive their negative electrostatic charges by conduction through the fibers of the belt, by induction, or by the corona discharge from the bottom electrode through the belt, and possibly by a combination of these. Whatever is the mechanism of the transmission of electrostatic charges, to the grains, the fact remains that the granular particles receive sufficient electrostatic charge to cause them to be oriented and forcibly driven upwardly through the strong electrostatic field from the feed belt against the under side of the adhesive coated web.

In operating our apparatus we prefer to space the electrodes 23 and 24 about one inch apart and to apply a potential difference between 30,000 and 100,000 volts. The potential difference applied to the electrodes is adjusted to such value that the abrasive particles on the feed belt 41 become charged and are propelled toward the upper plate 24 and strike the adhesive coating on the web P with sufficient force to partially embed themselves and adhere thereto. Other factors remaining constant, we have found that the voltage required to electrostatically propel the charged granules into engagement with the adhesively coated web varies in proportion to the size or mass of the granules; that is, a higher voltage is required for large grain than for a smaller size. For grits of from 50 to 200 mesh and finer we have found that potential differences of from 30,000 to 50,000 volts are suitable. Coarser grits require higher voltages and in the case of grits as large as 16 mesh, a potential difference of up to 90,000 volts may be required to orient and propel the granular material from the feed belt to the adhesive coated web.

Generally speaking an electrostatic field produced by a unidirectional current is more efficient in the projection of the larger or coarser particles and we prefer to employ either a continuous or pulsating unidirectional current with granular particles of 180 mesh in size and larger. However, particles of 200 mesh in size and smaller are more effectively projected by the electrostatic field produced by an alternating current field. This is particularly true of the very small abrasive particles of 400 to 600 mesh in size and also of fibrous materials which have a decided tendency to mat together or form an agglomerate mass of said particles. In coating these materials, we prefer to employ an alternating current of a frequency of 25 cycles per second, or less. While a 25 cycle alternating current has been found to be satisfactory in the range of particle sizes specified, we have also found that lower frequencies are advantageous in coating particle sizes in the region of 200 mesh in size. We have used alternating current frequencies as low as 5 cycles per second and the indications were that even lower frequencies would be beneficial.

We have found it desirable to apply a surplus of grain to the feed belt 41, in order to assure a uniform granular coating and to eliminate inherent difficulties with grain feed rolls. A granular coating of the desired density can be obtained by varying the applied voltage or the spacing between the upper and lower electrodes to project a portion of the grain from the feed belt, even though the feed belt carries an excess of grain.

Immediately after leaving the grain deposition zone, the adhesive carried by the web is subjected to a preliminary drying or setting operation so that the granules will be retained in their oriented position. The coated web then passes around the idler roll 49 and suction drums 51 and 52 to a drying rack 55 where the adhesive is permitted to set fully.

Among the advantages possessed by apparatus constructed in accordance with our invention are its simplicity, its ease of operation and its flexibility or ease of adjustment to meet different requirements.

Not all kinds of granular materials are equally affected by electrostatic forces, some being readily affected and others being slightly affected or requiring intense or highly concentrated forces to produce an appreciable effect. Apparatus constructed in accordance with our invention is readily adaptable to these different degrees of susceptibility and is positive in action. When used with material that is readily susceptible to electrostatic forces, the intensity of the electrostatic field set up between the electrodes can be adjusted to produce a granular coated web of the desired characteristics. Adjustment of the intensity of the electrostatic field to a higher concentration or greater density causes less susceptible particles to act in the same manner as more susceptible particles act in a lower intensity field.

The intensity of the electrostatic field also can be adjusted to apply dense coatings of granular material on the web by merely increasing the intensity of the electrostatic field. Coatings of lesser density can be secured by decreasing the intensity of the electrostatic field.

The density of the coating of the granular material on the web also can be increased or decreased by adjusting the web closer to or farther from the surface of the granular material on the feed belt.

The apparatus constructed in accordance with our invention produces abrasive paper or cloth of an improved quality in that a larger proportion of the abrasive grains are oriented with their longest dimensions substantially normal to the surface of the paper or cloth. Tests have shown that with our apparatus, the greater part, and in some cases substantially all, of the grains that are susceptible of orientation are oriented normally to the face of the backing web. In the usual crushed granular abrasive material, some of the particles have one dimension much longer than the other dimensions, as in the case of splintery grains, or have two dimensions much longer than the other as in plate-like grains. This type of grain can be advantageously oriented to have their longest dimensions substantially normal to the surface of the paper or cloth backing. Some of the grains have all dimensions substantially the same, and consequently, can not be advantageously oriented. We have found, as above stated, that our apparatus orients the majority, if not practically all, of the grain that can be advantageously oriented. By employing a suitable method of separation, such as air separation, a granular material can be secured that has a much larger proportion of the elongated or splintery and plate-like type of grains than the usual granular material, and such material can be used to particular advantage in making abrasive paper and cloth on our machine.

The conditions to which the elongated particles are subjected in our machine are such as to secure the greatest degree of orientation upon the finished abrasive paper or cloth. The abrasive grain is carried into the electrostatic field in a quiescent condition. The particles are projected from the belt vertically upward by the projecting influence of the electrostatic field alone, which serves not only to project the particles, but also to turn the particles in a direction so that their longest dimensions will be parallel to the lines of electrostatic force or vertical. Since the web of paper or cloth is horizontal and with an adhesive coated face downward, the force of gravity assists rather than hinders the orientation of the particles with their longest dimensions normal to the surface of the paper or cloth because the particles are projected against the bottom of the adhesive coated paper or cloth and those longer particles that strike the adhesive coated surface tend to hang downward like pendulums. The effect of gravity, moreover, not only preserves the desired orientation but also tends to swing such particles that may have struck the surface in an inclined position downward into a position in which the major axes are substantially vertically downward from the adhesive surface. As shown in the drawings, the paper is maintained substantially horizontal until the adhesive is initially set to hold the grains thus oriented, before the paper is turned into a vertical direction.

The arrangement in which the web is passed substantially horizontally and with its adhesive coated side downwardly through the grain depositing and orienting device is particularly advantageous in securing good distribution and orientation of the grain on the backing. The loose mass of abrasive grain on the feed belt is not projected bodily upward at any one point when the feed belt passes between the electrodes. Instead, a relatively small proportion of the particles are projected upwardly at any one time and place. As a sufficient electric charge builds up on a particle, it is individually projected upwardly so that the appearance of the space between the electrode and the body of the paper is that of an upwardly directed rain or spray of particies that are spaced apart from each other. The particles that strike the adhesive coated surface stick to it, but the particles that strike already applied grains bound back against the belt. The length of the electrodes between which the web passes is such that the coating is gradually built up to the desired density. At no point is the grain projected in a concentrated mass or stream which would interfere with free orientation of the individual grains under the orienting influence of the electrostatic field.

The type of electrode herein described has been found to be of considerable importance because it permits the application of potential differences of sufficient magnitude, for example, 30,000 to 100,000 volts, to be applied to the electrode without sparking or arcing between the electrodes to make it possible to project grains upwardly to the underneath surface of the web. When metal electrodes are used, the applied potential difference, as well as the closeness of the spacing of the electrodes, is very limited because a potential difference of 10,000 volts per inch of spacing is about the safe limit that can be applied without danger of arcing or spark-over. Thus, metal electrodes require greater spacing or lower applied potential differences, with the consequence that the intensity of the electrostatic field and the repulsion force exerted against the granular particles are materially reduced. By employing an electrode of the character described, namely a plate of poorly conducting material, potential differences up to 100,000 volts can be applied without arcing or spark-over when the electrodes are spaced about one inch apart. This makes it possible to produce an electrostatic field of far greater intensity than could be obtained by the use of metal electrodes.

Also, the relatively large size of the electrodes gives a substantially vertical electrostatic field over a considerable area as contrasted with a small electrode. If a small electrode were used, the tendency would be to give a dispersed electrostatic field that would tend to drive the abrasive particles out of the stronger portion into the weaker portion of the field.

The effect in area of the electrostatic field may be readily varied by moving or disconnecting some of the electrodes 23 thereby varying the density of the grain coating so as to give either a full-coated or open-coated abrasive paper or cloth.

The effect of projecting the grain as a sort of upwardly directed rain or spray of grain, by which a grain that strikes a free adhesive surface finds lodgment thereon, while a grain that strikes a point already covered by a previously deposited grain falls back, results in securing great uniformity in the application of the grain to the surface.

It will be noted further, as shown in the drawings, that at no time before the adhesive has set is the abrasive surface of the web brought into contact with rolls or other devices that would tend to flatten the grain.

As will be apparent from the above description, our apparatus successfully overcomes disadvantages inherent in various devices that have been proposed heretofore for the electrostatic deposition or orientation of grain upon abrasive paper or cloth.

While we have referred generally to granular or abrasive particles in this specification, we do not wish to be specifically limited thereby but extend such meaning to include all materials that can be electrically charged and projected by means of an electrostatic field. Such materials include, for example, various granular material, abrasive granules, flakes of graphite, mica and the like, bristles of various kinds, textile fibers (commonly referred to as flock) and practically all particles of elongated material.

Other advantages will be apparent from the foregoing disclosure to those skilled in the art and while specific embodiments have been used to illustrate our invention, it is to be understood that the invention is not limited to those embodiments but is defined by the appended claims.

We claim:

1. Apparatus for the manufacture of abrasive coated webs comprising upper and lower electrodes, means for applying an alternating electromotive force of a high potential difference to the upper and lower electrodes, means for supporting an adhesive coated web between said electrodes and with an adhesive coated surface downward, and means for supplying abrasive particles between said web and the lower of said electrodes, said apparatus being adapted electrostatically to project the abrasive particles against the downwardly facing adhesive surface of the web.

2. Apparatus for the manufacture of coated webs comprising upper and lower electrodes, a source of periodically pulsating electromotive force for applying a high electrical potential difference between them, means for passing an adhesive coated web between said electrodes with an adhesive coated surface thereof downward, and means for supplying particles between said web and the lower electrode, said apparatus being adapted electrostatically to project the particles upwardly against the downwardly facing adhesive coated surface of the web.

3. Apparatus for the manufacture of coated webs comprising upper and lower electrodes, a source of high voltage adapted to apply a series of intermittent unidirectional electrical impulses to the upper and lower electrodes, whereby a high potential electrostatic field is produced therebetween, means for passing an adhesive coated web between said electrodes and with an adhesive coated surface downward, and means for supplying particles between said web and the lower electrode, said electrical impulses being of such duration that the particles are electrically charged and projected upwardly against the downwardly facing adhesive coated surface of the web.

4. Apparatus for the manufacture of coated webs comprising upper and lower electrodes, means for applying a high potential difference to the upper and lower electrodes, means for producing a pulsating electrostatic field between said electrodes, means for passing an adhesive coated web between said electrodes and with an adhesive side downward, and means for supplying particles between said web and the lower of said electrodes, said apparatus being adapted electrostatically to project the particles against the downwardly facing adhesive surface of the web.

5. Apparatus for the manufacture of coated webs comprising upper and lower electrodes, a high tension electrical circuit connected to said electrodes whereby a high potential electrostatic field is produced between them, means operatively connected to said high tension electrical circuit for controlling the character of the electrostatic field produced, means for passing a web between said electrodes, means for supplying particles between said web and the lower electrode, said apparatus being adapted electrostatically to project the particles against the said web.

6. Apparatus for the manufacture of coated webs comprising upper and lower electrodes, means for applying a high electrical potential, having an alternating frequency of 25 cycles per second, or less, to said electrodes, whereby a high potential electrostatic field is produced therebetween, means for passing an adhesive coated web between said electrodes with an adhesive surface thereof downward, means for supplying particles between said web and the lower electrode, said apparatus being adapted electrostatically to project the particles upwardly against the downwardly facing adhesive surface of the web.

7. Apparatus for forming particle-surfaced material comprising means for establishing an electric field of periodically alternating polarity, means for continuously introducing into said field adhesive-surfaced foundation material and means for introducing particles into said field.

8. Apparatus for forming particle-surfaced material comprising means for feeding along a predetermined path a foundation material, means for coating the foundation material with adhesive, means for creating an electric field of alternating potential intersecting said path and means for introducing particles into said field.

9. In an apparatus for the production of particle-surfaced materials by electrostatic deposition, opposed electrode members, means for passing a sheet of backing material between the electrode members, means for introducting elongated particles between the electrode members, and means for impressing an intermittent unidirectional potential across said electrode members so as to project and orient the elongated particles with respect to the backing.

10. In an apparatus for the production of particle-surfaced materials by electrostatic deposition, opposed electrode members, means for passing an adhesively coated web of backing material between the electrode members, means for supplying elongated particles between the electrode members, and means for impressing an intermittent unidirectional potential across said electrode members so as to project said particles against the backing and orient them with respect thereto.

11. In an apparatus for the production of particle-surfaced materials for electrostatic deposition, opposed upper and lower electrodes, means for passing an adhesively coated web between the electrodes with the adhesively coated face downwardly, a feed belt between said web and the lower electrode for supplying elongated particles between the electrode members, and means for impressing an intermittent unidirectional potential across said electrode members so as to project the elongated particle upwardly against the adhesively coated web and orient them with respect thereto.

12. In an apparatus for the production of particle-surfaced materials by electrostatic deposition, opposed electrode members, means for passing an adhesively coated web of backing material between the electrode members, means for supplying elongated particles between the electrode members, and means for establishing an electric field of periodically alternating polarity across the electrode members so as to project said particles against the backing and orient them with respect thereto.

13. Apparatus for applying small discrete particles to a foundation material by electrostatic deposition which comprises spaced electrodes, means for passing the foundation material and the particles between said electrodes, and means for impressing an intermittent unidirectional potential across said electrodes.

14. Apparatus for applying small discrete particles to a foundation material by electrostatic deposition which comprises spaced electrodes between which the foundation material and the particles are placed, means for introducing the foundation material and the particles between the electrodes and means for impressing a pulsating electric potential across said electrodes.

15. Apparatus for the production of materials surfaced with elongated particles which comprises opposed electrode members, means for introducing the material to be surfaced and the elongated particles between the electrode members, and means for establishing an electrical field of periodically alternating polarity across the electrode members so as to project and orient the elongated particles with respect to the material to be surfaced.

ROMIE L. MELTON.
RAYMOND C. BENNER.
HENRY P. KIRCHNER.

REFERENCES CITED

The following references are of record in the file of this patent:

UNITED STATES PATENTS

| Number | Name | Date |
| --- | --- | --- |
| 1,549,875 | Horne | Aug. 18, 1925 |
| 1,854,071 | Schacht | April 12, 1932 |
| 1,855,869 | Pugh | April 26, 1932 |
| 2,027,307 | Schacht | Jan. 7, 1936 |
| 2,047,525 | Thode | July 4, 1936 |
| 2,173,032 | Wintermute | Sept. 12, 1939 |
| 2,173,078 | Meston | Sept. 12, 1939 |
| 2,187,624 | Melton et al. | Jan. 16, 1940 |